March 2, 1965 E. R. DE VRIES ETAL 3,171,827
REFLECTIVE GRANULES
Filed Oct. 31, 1960

INVENTOR
Eduard R. de Vries &
Alistair J. Ross

BY Karl W. Flocks
ATTORNEY 3,171,827
REFLECTIVE GRANULES
Eduard R. de Vries, Huntingdon, Pa., and Alistair J. Ross, Wallingford, Conn., assignors to Prismo Safety Corporation, Huntingdon, Pa., a corporation of Pennsylvania
Filed Oct. 31, 1960, Ser. No. 66,060
12 Claims. (Cl. 260—40)

The present invention relates to reflective granules and more particularly to reflective granules and the method of making them, such granules being suitable for use in highway markers.

Heretofore in highway markers it has become standard practice to incorporate small glass spheres in the traffic paint either as a pre-mix or by dropping the glass spheres onto the paint while it is still tacky so that the spheres are partially embedded in the paint when it has dried. These spheres render the marker reflex reflective and reflect the light from the headlights of automobiles back to the source.

The present invention is an improvement over the use of glass spheres as indicated above in highway markers.

An object of the present invention is to provide a novel type of reflective granule that can be dropped onto highway markers.

A further object of the present invention is to provide a novel method of manufacturing these reflective granules.

A still further object of the present invention is to provide a novel highway marker which utilizes these reflective granules.

Other objects and the nature and advantages of the instant invention will be apparent from the following description taken in conjunction with the accompanying drawings, wherein.

Figure 1:
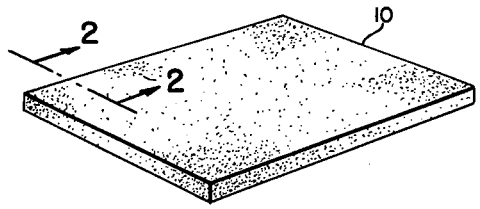
FIG. 1 is a perspective view of a molded block of binder and glass spheres.

The reflective granule made in accordance with the present invention is a mixture of glass spheres and a suitable binder, the granule being of irregular shape and having its outer surface covered with glass spheres which are partially embedded in the binder with their outer surfaces free of the binder.

These granules may be manufactured by mixing a binder and a plurality of glass spheres. The mixture is solidified to a rigid consistency. The solidified rigid mass is then broken up into small granules. The breaking up operation exposes the glass spheres since the line of cleavage will pass through the weakest point which is the bond between the glass and the binder.

When incorporated in a reflective marker, these granules afford excellent reflectivity and angularity since they are raised over the surface of the line. Since the spheres are tightly held in the pockets of the rigid binder they will not be abraded from the surface of the granules. At the same time, due to the pigmentation of the binder, the daylight appearance of the reflective marker is not affected.

As a binder, rigid type polyesters, polystyrene, epoxides and other thermoplastic or thermosetting materials may be used so long as they are rigid enough at room temperatures to be broken up into granules, but not so brittle that they would shatter to dust completely; and as long as the bond to the glass surface is not too great. It is essential that the line of cleavage be the bond between the glass and the binder so that the glass beads exposed at the line of cleavage will have no binder thereon at the exposed surfaces. When thermoplastics are used, the spheres are added to the material while hot and molten and, after cooling, the rigid mass resulting can be broken up. The binder may also be a lower melting glass, hard rubber or similar materials which solidify to a rigid state.

The binder may include other materials such as pigments and fillers, catalysts, accelerators, solvents, and the like, as necessary.

Particularly good results have been obtained using rigid polyester resin compositions as the binder. In general, rigid polyester resin compositions suitable for use in this invention comprise an unsaturated polyester resin and a monomeric polymerizable material that does not give off volatile matter during curing.

Polyester resins are a class of resins which is well known to those skilled in the art. In general, polyester resins are unsaturated alkyd resins formed by the reaction of one or more dicarboxylic acid components and one or more polyhydric alcohols. Illustrative of the dicarboxylic acid components are the saturated components phthalic anhydride and adipic and azelaic acids, and the unsaturated components, fumaric acid and maleic acid. Illustrative of the dihydric alcohols most commonly used are glycols of ethylene, propylene, 1,3- and 2,3-butylene, diethylene and dipropylene. An unsaturated monohydric alcohol, such as allyl alcohol, may be used in place of part of the polyhydric alcohol. One or more of the acid components or polyhydric alcohols should contain a reactive double or ethylenic linkage. It is essential that one of the components of the polyester resin contain an unsaturated ethylenic linkage. The polyester reaction products are mixed with a non-volatile unsaturated monomeric cross-linking agent for the polyester resin. Illustrative of the monomeric agents are the unsaturated hydrocarbons, such as styrene, vinyl toluene, vinyl acetate, methyl methacrylate, alpha and para methyl styrene, divinyl benzene, ethyl acrylate, acrylonitrile, diallyl esters, cyclopentadiene, triallyl cyanurate and many others. The monomeric agent serves to make the polyester resin more fluid and also to crosslink the resin at the time of curing of produce a crosslinked or three dimensional polyester resin, which is thermosetting in character. The monomeric agent is of a nature that it is consumed during the curing of the resin without forming volatile materials.

The properties of the polyester resin compositions can be varied through the use of various dibasic acids, different glycols, and different monomers, each in varying ratio to the others, permitting preparation of end products with almost any desired properties. Certain of these polyester resins form masses upon curing that are very rigid or inflexible. These rigid type polyester resins are available commercially. Generally speaking, the rigid type polyester resins are characterized as being the product of components containing larger amounts of unsaturated components than do the flexible type polyester resins.

Suitable catalysts which are added to the formulation to cure the polyester resin composition may be selected from a large number of oxidizing catalysts, such as benzoyl peroxide, di-t-butyl peroxide, 2,4-dichlorobenzoyl peroxide, methyl ethyl ketone peroxide, cyclohexane peroxide, cumene hydroperoxide, bis (parabromobenzoyl) peroxide, bis (phthalyl) peroxide, bis (parachlorobenzoyl) peroxide, bis (succinyl) peroxide, acetyl benzoyl peroxide, bis (chloroacetyl) peroxide, bis (acetyl) peroxide, tertiary-butyl hydroperoxide, bis (dichlorobenzoyl) peroxide, and 2,2-bis (tertiary-butyl peroxy) butane, with which those skilled in the art are familiar. For rapidly curing polyester compositions, the catalyst at least in part is benzoyl peroxide.

Accelerators for the polyester composition may be added to decrease the time necessary for gelation or cure of the resin. When accelerators are used, no heat is needed and the composition can be cured at room temperatures.

Illustrative of the accelerators are the cobalt, manganese, vanadium, calcium and iron soaps of organic acids, such as the naphthenates, dimethylaniline, and mixtures of dimethylaniline with ethylene diamine, diethylene triamine, triethylene tetramine, tridimethyl amino methyl phenol, and other primary, secondary and tertiary amines which act to catalyze the reaction between the isocyanate and the residual hydroxyl groups of the polyester resins.

The epoxy resins which may be employed in accordance with the present invention are commonly referred to as polyglycidyl ethers of polyhydric alcohols and glycidyl ethers of bis-phenols, characterized by the following general formula:

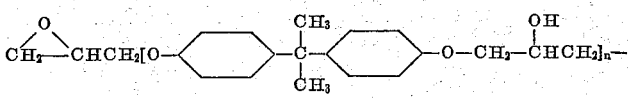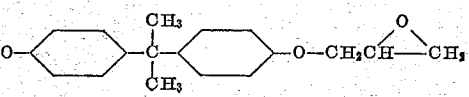

wherein $n$ represents the extent of copolymerization and varies between 0 and 10 indicating molecular weights of 400 to approximately 8000. These products contain both epoxide and hydroxyl groups capable of further reaction. It is the combination of these groups with the curing agent that results in the cured resin systems. Various amines, such as ethylene diamine, triethylene tetramine, dimethyl amino methyl phenol, tri (dimethyl amino methyl) phenol, diamino diphenyl sulfone, metaphenylene diamine, and diethyl aminopropylamine, acid anhydrides, organic sulfonic acids, dibasic acids and resins, such as polyamides, are typical curing agents.

The epoxy resins are commercially sold by Shell Chemical Corp. under the tradenames of Epons. Epon 828, for example, has a melting point of 8–12° C. and an epoxide equivalent ranging between 190–210. By the epoxide equivalency is meant the average number of 1,2-epoxy groups contained in the average molecule. It is expressed in the trade as the grams of the polymeric material or resin containing one gram equivalent of epoxide.

It should be understood that the epoxy resins suitable for use in this invention are not limited to those described above. Any resinous material containing reactive epoxy groups, whether aliphatic or aromatic, may be used so long as the material will cure in the presence of curing agents to a solid condition. For example, a dicyclodiepoxy carboxylate resin may be used which is sold by Union Carbide and Carbon Co. as Epoxide 201.

In the use of the epoxy resin as the binder, a heat sensitive catalyst may be used which yields a composition that is room temperature stable. An example of such a catalyst is a boron fluoride amine complex. Such compositions can be readily cured after the glass spheres have been admixed by heating.

Pigment may be added to the binder to impart reflection to the composition as well as color and opacity. To produce a white reflecting composition, it is necessary to have a prime pigment, such as rutile titanium dioxide, to furnish the necessary whiteness and opacity. In place of the rutile titanium dioxide, anatase titanium dioxide may be substituted. Other pigments that may be used for white and colored compositions are as follows: aluminum oxide, iron oxide, silicon carbide, antimony oxides, lead oxide, lead chromates, zinc chromates, cadmium pigments, siennas, umbers, inorganic or organic reds, chrome yellows, chrome oranges, chrome greens, etc. The pigments can be extended with barium sulphate, calcium sulphate, magnesium silicate, zinc oxides, zinc sulphide, normal or high strength lithopones, diatomaceous silica, amorphous and crystalline silica, micaceous materials, barium sulphate, whiting, wollastonite pumices, calcium carbonate, clay, talc, perlite, asbestos, granular marble, sand, glass cullet, and other natural or manufactured granular materials.

The following are specific examples of formulations in accordance with this invention which are illustrative only and should not be construed as limiting the scope of the invention:

Binder: Parts by wt.
 Rigid polyester resin composition _____ 50–150
 Extenders and pigments _____ 0–50
 Accelerators for the polyester resin _____ 0–5
 Catalyst for the polyester resin _____ 1–10
 Unsaturated polymerizable monomer solvent _____ 0–50
 Glass spheres: 1–10 parts by weight per 1 part of binder.

The optimum proportion of glass spheres have been found to be 4 parts by weight per part of binder to give maximum filling while still maintaining flow properties for handling and curing the material. The size of the glass spheres can vary from ½ mil up to 30 mils. Obviously the size of the reflective aggregate product will be dependent to a certain extent on the size of the glass spheres. In general, the reflective granules have an average maximum dimension that is from 3 to 10 times the diameter of the glass spheres used.

The glass spheres can be clear transparent glass or for certain purposes they may be reflectively coated spheres such as silvered glass spheres or even metallic spheres.

The index of refraction of the glass may vary for different purposes from approximately 1.5 up to high index glass of 2.1 or higher.

It has been found advantageous to use glass spheres which have been moisture-proofed with a silicone water repellent. This yields a somewhat cleaner surface of the exposed glass spheres than the unmoisture-proofed glass spheres.

The specific example of a formulation which has given excellent results is:

*Example 1*

Binder: Parts by wt.
 Rigid polyester resin composition _____ 100
 Titanox RA _____ 30
 Benzoyl peroxide _____ 5
 Glass spheres: 4 parts by weight per part of binder.

Figure 2:
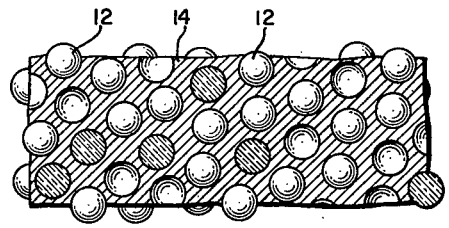
FIG. 2 is an enlarged sectional view along the line 2—2 of FIG. 1.
Figure 3:
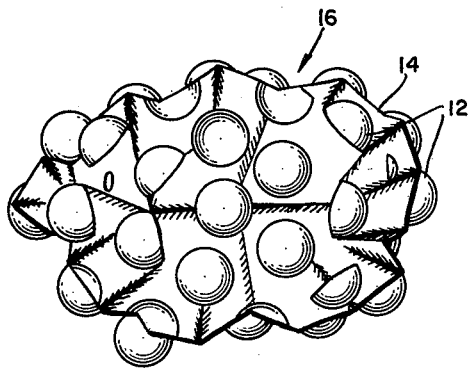
FIG. 3 is an enlarged plan view of a reflective granule made in accordance with this invention.
Figure 4:
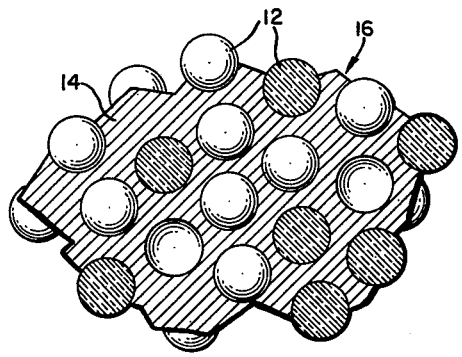
FIG. 4 is an enlarged sectional view along the line 4—4 of FIG. 3.

The mixture of binder and glass spheres was cured by heating with the glass spheres uniformly distributed therethrough to yield a rigid mass as shown in FIGS. 1 and 2. The mass 10 included the glass spheres 12 and the binder 14. The mass was then crushed into individual granules 16 as shown in FIG. 3, wherein the cleavage occurred between the glass spheres and the binder so as to expose the surfaces of the glass spheres 12, as shown in FIG. 3. The resulting granules were thus covered with a plurality of glass spheres partially embedded in the binder and partially exposed. The reflective granules 16 are of irregular shape and are made up of a mixture of the reflecting pigmented binder and the glass spheres distributed throughout the granule.

Example 2

| Binder: | Parts by wt. |
|---|---|
| Epoxy resin (Epon 828) | 100 |
| Catalyst for epoxy resin | 10 |
| Titanox RA | 40 |

Glass spheres: 4 parts by wt. per part of binder.

Figure 6:
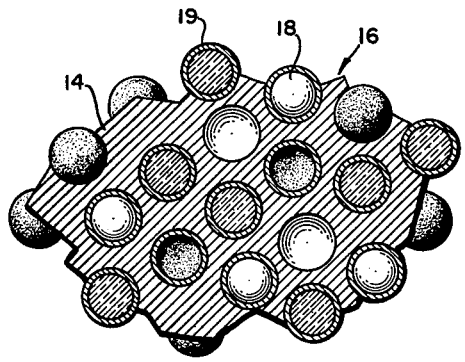
FIGS. 6 and 7 are enlarged sectional views similar to FIG. 4 of reflective granules made by a modified form of the invention.
Figure 7:
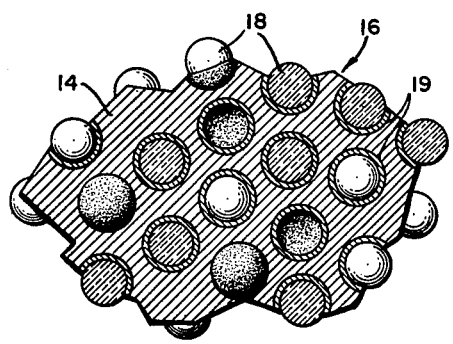

When reflectively coated glass spheres 18 are used in place of the transparent glass spheres 12, the resulting granule formed is shown in FIG. 6. When the reflectively coated glass spheres are used, as shown in FIG. 6, the binder itself need not be reflective. For certain purposes the outer exposed reflective coating on the spheres 18 can be removed by washing with nitric acid having the reflective coating only on the undersides of the spheres 19. No reflective binder is needed in this case. This form of granule is shown in FIG. 7.

It should also be noted that when very high index transparent glass spheres are used which have an index of refraction high enough such that the point of focus of the light returned is within the spheres, approximately 2.0 or over, the binder need not be reflective since the light will be reflected back from within the spheres and the reflective backing is no longer required.

For reflectivity, an aluminum powder or flake can be incorporated in the binder along with the glass spheres. For certain purposes a filler of glass cullet or gold or silverized glass cullet or flakes can be incorporated in the binder along with the glass spheres. It has been found that during the crushing step the break generally does not occur at the surface of the cullet, but at the surface of the glass spheres. Thus, the cullet tends to form the core of the granule with the glass spheres on the exposed surfaces.

Figure 5:
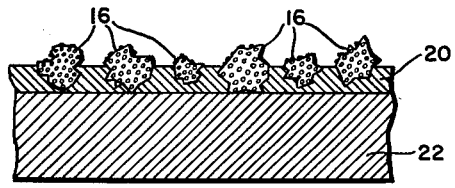
FIG. 5 is a sectional view through a roadway marker showing the granules partially embedded in the binder coating.

The reflective granules 16 are used, as shown in FIG. 5, in a reflective marker, by applying a binder coating 20 onto the subsurface or sign 22 and then dropping on the reflective granules 16 so that they become partially embedded in the coating.

These reflective granules adhere well to the binder coating particularly when a binder coating is used which has a binder similar to that used in the granules.

The crushing of the rigid mass may be accomplished in any standard apparatus, such as by impact, crusher, roll grinder, hammer mill, and the like.

Although the invention has been described with polyester resin composition binders, it should be understood that other binders are equally useful such as polystyrene, epoxy resins, and other thermoplastic or thermosetting materials may be employed so long as they form a rigid mass that can broken up into granules with the line of cleavage being the bond between the glass and binder.

It is contemplated that low melting glasses, such as borax glass, can be utilized as the binder with high index glass spheres added during the melt. During the quenching and breaking the high index glass spheres will be exposed. It is also contemplated that the binder may be a hard rubber composition either natural or synthetic that solidifies to a rigid state that may be crushed into granule form.

The size of the reflective granules is relatively unimportant. Good results have been obtained when the granules are approximately 0.10 inch in their maximum dimensions. The size of the granules is somewhat dependent on the size of the glass spheres incorporated. If the granules are crushed too much, they will result in binder dust and free glass spheres. An average dimension of from 3 to 10 times the diameter of the glass spheres used is satisfactory for most purposes.

It will be obvious to those skilled in the art that various changes may be made without departing from the spirit of the invention and, therefore, the invention is not limited to what is shown in the drawings and described in the specification but only as indicated in the appended claims.

What is claimed is:

1. A method of making small reflective granules which comprises mixing a fluid binder composition with small glass spheres, said glass spheres having a diameter in the range of 0.5–30 mils, the proportion of said glass spheres to said binder composition being 1–10 parts by weight of glass spheres to 1 part of binder composition, said binder composition being capable of assuming a rigid crushable condition at room temperatures and being capable of forming a bond to glass spheres which is less than its bond to itself, solidifying said mixture to a rigid crushable mass in which the bond between the glass and the binder is less than the bond of the binder to itself, crushing said mass to form a plurality of small granules with the line of cleavage between the glass spheres and the binder composition whereby each granule has an outer surface which is covered with a plurality of the glass spheres which are partially embedded therein.

2. The method of claim 1, wherein the binder is a rigid polyester resin composition consisting essentially of a rigid polyester resin, and a peroxide type polymerization catalyst for said polyester resin, said rigid polyester resin comprising the reaction product of at least one dicarboxylic acid and at least one dihydric alcohol wherein at least one acid or alcohol component contains a reactive double bond, in admixture with a normally liquid vinylidene monomer copolymerizable therewith.

3. The method of claim 1, wherein the glass spheres are transparent and the binder composition has a reflective pigment therein.

4. A small reflective granule comprising an irregularly shaped crushed particle of a mixture of a binder composition and small glass spheres, said spheres having a diameter in the range of 0.5–30 mils, the proportion of said spheres to said binder composition being 1–10 parts by weight of spheres to 1 part of binder composition, the spheres being distributed throughout the granule and partially embedded in the outer surface thereof.

5. A reflective granule in accordance with claim 4, wherein the binder composition has a reflective pigment therein and the glass spheres are transparent.

6. A reflective granule in accordance with claim 4, wherein the glass spheres each have a reflective coating on the embedded portions thereof.

7. A reflective granule in accordance with claim 4, wherein the binder composition is a cured rigid polyester resin composition, said polyester resin comprising the reaction product of at least one dicarboxylic acid and at least one dihydric alcohol wherein at least one acid or alcohol component contains a reactive double bond, in admixture with a normally liquid vinylidene monomer copolymerizable therewith.

8. A reflective granule in accordance with claim 4, wherein the binder composition has a reflective pigment therein.

9. A reflective granule in accordance with claim 4, wherein the binder composition contains glass cullet as a filler.

10. A reflective granule in accordance with claim 9 wherein the glass cullet has a reflective coating thereon.

11. A method of making small reflective granules which comprises mixing a fluid binder composition with small reflectively coated glass spheres, said glass spheres having a diameter of the range of 0.5–30 mils, the proportion of said reflectively coated glass spheres to said binder composition being 1–10 parts by weight of reflectively coated glass spheres to 1 part of binder composition, said binder composition being capable of assuming a rigid crushable condition at room temperatures and being capable of forming a bond to said reflectively coated glass spheres which is less than its bond to itself, solidifying said mixture to a rigid crushable mass in which the bond between the reflectively coated glass spheres and the binder composition is less than the bond of the binder composition to itself, crushing said mass to form a plurality of small granules with the line of cleavage between the reflectively coated glass spheres and the binder composition, whereby each granule has an outer surface which is covered with a plurality of reflectively coated glass spheres which are partially embedded therein, and treating said granules to remove the outer reflective coating from the exposed surfaces of the reflectively coated glass spheres.

12. A method of making small reflective granules which comprises mixing a fluid binder composition with small glass spheres, said glass spheres having been moisture-proofed before they are admixed with the binder, said moisture-proofed glass spheres having a diameter in the range of 0.5–30 mils, the proportion of said moisture-proofed glass spheres to said binder composition being 1–10 parts by weight of moisture-proofed glass spheres to 1 part of binder composition, said binder composition being capable of assuming a rigid crushable condition at room temperatures and being capable of forming a bond to said moisture-proofed glass spheres which is less than its bond to itself, solidifying said moisture to a rigid crushable mass in which the bond between the moisture-proofed glass spheres and the binder composition is less than the bond of the binder composition to itself, crushing said mass to form a plurality of small granules with the line of cleavage between the moisture-proofed glass spheres and the binder composition, whereby each granule has an outer surface which is covered with a plurality of moisture-proofed glass spheres which are partially embedded therein.

References Cited by the Examiner
UNITED STATES PATENTS

| | | | |
|---|---|---|---|
| 1,099,837 | 7/13 | Black | 18—48.8 |
| 2,454,910 | 11/48 | Corr | 18—60 |
| 2,592,882 | 4/52 | Fisher et al. | 88—82 |
| 2,713,286 | 7/55 | Taylor | 88—82 |
| 2,806,509 | 9/57 | Bozzacco et al. | |
| 2,829,982 | 4/58 | Hoyt. | |
| 2,897,733 | 8/59 | Shuger | 260—40 XR |
| 3,036,928 | 5/62 | Poole | 260—40 XR |

MORRIS LIEBMAN, *Primary Examiner.*

TERRY J. ANDERSON, MILTON STERMAN,
*Examiners.*